(12) United States Patent
Nagata et al.

(10) Patent No.: US 6,400,437 B1
(45) Date of Patent: Jun. 4, 2002

(54) LIGHT SEMITRANSMITTING TYPE LIQUID CRYSTAL DISPLAY DEVICE

(75) Inventors: Yasunari Nagata; Kengoh Aoki; Toshirou Motomura, all of Kagoshima (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/606,551

(22) Filed: Jun. 29, 2000

(30) Foreign Application Priority Data

Jun. 30, 1999 (JP) .......................................... 11-186758

(51) Int. Cl.⁷ .......................... G02F 1/33; G02F 1/1335
(52) U.S. Cl. ........................................ 349/143; 349/113
(58) Field of Search .................................. 349/142–145, 349/112, 113, 97, 121; 430/7

(56) References Cited

U.S. PATENT DOCUMENTS

| | | | |
|---|---|---|---|
| 5,204,765 A | 4/1993 | Mitsui et al. | |
| 5,418,635 A | 5/1995 | Mitsui et al. | 359/70 |
| 5,684,551 A | 11/1997 | Nakamura et al. | 349/99 |
| 5,753,937 A | 5/1998 | Shimomaki et al. | |
| 5,805,252 A | 9/1998 | Shimada et al. | 349/113 |
| 6,097,459 A | 8/2000 | Shimada et al. | 349/113 |
| 6,144,432 A * | 11/2000 | Hatanaka et al. | 349/113 |
| 6,147,728 A * | 11/2000 | Okumura et al. | 349/113 |

FOREIGN PATENT DOCUMENTS

| | | |
|---|---|---|
| JP | 4-243226 | 8/1992 |
| JP | 8-292413 | 11/1992 |
| JP | A 5-232465 | 9/1993 |
| JP | 7-318929 | 12/1995 |
| JP | 7-333598 | 12/1995 |
| JP | A 8-95071 | 4/1996 |
| JP | A 8-101383 | 4/1996 |
| JP | 8-201802 | 8/1996 |
| JP | A 8-292413 | 11/1996 |
| JP | A 10-186359 | 7/1998 |
| JP | A 11-84360 | 3/1999 |
| JP | A 11-84375 | 3/1999 |

* cited by examiner

*Primary Examiner*—Akm E. Ullah
(74) *Attorney, Agent, or Firm*—Hogan & Hartson, LLP

(57) ABSTRACT

An object of the present invention is to provide a light semitransmitting type liquid crystal display device which avoids a decrease of contrast due to backscattering in a reflective type display mode. In a light semitransmitting type liquid crystal display device: a group of bumps is formed on a glass substrate and the group of bumps is coated with a light semitransmitting film and an orientation layer; a color filter, an overcoat layer, transparent electrodes and an orientation layer are formed on a glass substrate; the glass substrates are opposed to each other via liquid crystal; and a first retardation film, a second retardation film and a polarizer plate are sequentially formed outside the glass substrate.

8 Claims, 12 Drawing Sheets

INCIDENT LIGHT        REFLECTED LIGHT

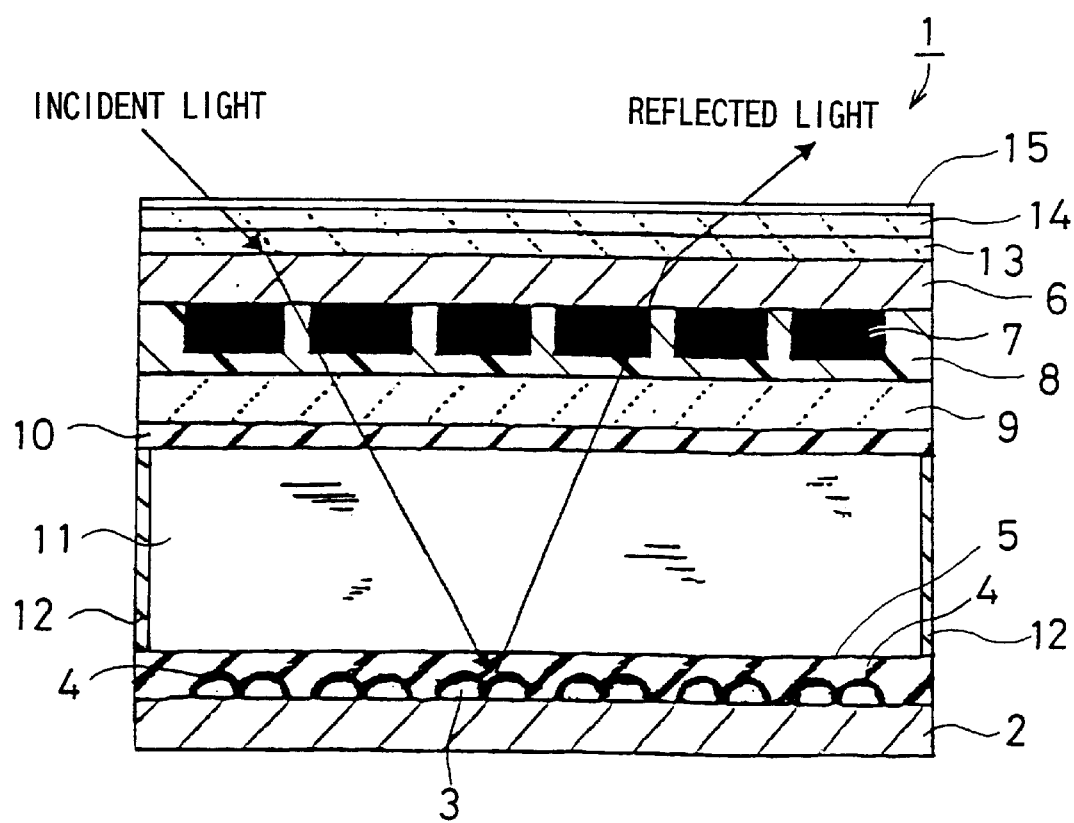

LIGHT SEMITRANSMITTING TYPE LIQUID CRYSTAL DISPLAY DEVICE

BACKGROUND OF THE INVENTION

1. Field of the Invention

The present invention relates to a light semitransmitting type liquid crystal display device.

2. Description of the Related Art

In recent years, techniques relating to a reflective type liquid crystal display device without using a backlight have been developed, which are excellent at making a liquid crystal display device low-profile, lightweight and low-power-consumption.

There are two types of reflective type liquid crystal display devices: a function separation type wherein a light reflecting layer with a mirror surface is disposed on a surface of a rear placed substrate and a scattering plate is disposed outside a front placed substrate (Japanese Unexamined Patent Publication JP-A 8-201802 (1996)); and a scattering reflection type wherein an uneven light reflecting layer is formed on a rear placed substrate (Japanese Unexamined Patent Publication JP-A 4-243226 (1992)). Both the types do not use a backlight, thereby effectively using ambient light.

A scattering reflection type of TN-mode or STN-mode liquid crystal display device is shown in FIG. 19.

In FIG. 19, a liquid crystal display device 1 comprises a glass substrate 2, a group of bumps formed on the glass substrate 2 by arranging at random a lot of almost hemispherical bumps 3 made of resin in a photolithography process, a light reflecting layer 4 made of metal with which the group of bumps is coated, and an orientation layer 5 with which the light reflecting layer is coated. The liquid crystal display device further comprises a glass substrate 6, a color filter 7 formed on the glass substrate 6, an overcoat layer 8 with which the color filter is coated, a plurality of transparent strip electrodes 9 made of ITO or the like arranged on the overcoat layer 8, and an orientation layer 10 with which they are coated. Both the substrates are opposed to each other via liquid crystal 11 sealed into a region surrounded by a seal member 12, and a first retardation film 13, a second retardation film 14 and a polarizer plate 15 are sequentially formed on the outer surface of the glass substrate 6.

The light reflecting layer 4 is formed by coating the group of bumps with a metal film such as Al film by spattering The Al film is made of a lot of strips arranged in parallel, and the respective strips correspond to individual electrodes (the light reflecting layer 4).

In the liquid crystal display device 1 of the above construction, light enters sequentially the polarizer plate 15, the second retardation film 14, the glass substrate 6 and the liquid crystal 11, and is reflected by the light reflecting layer 4. The reflected light is emitted through the liquid crystal 11 again, and thus the device 1 is of scattering reflection type.

Other than such a reflective type liquid crystal display device, an STN light semitransmitting liquid crystal display device which can be used both outdoors and indoors has been developed for a portable information terminal and the like.

The light semitransmitting type liquid crystal display device is used as a reflective type device with an external lighting such as sunlight or a fluorescent lamp and used as a light transmitting type device with a backlight mounted as an internal lighting, and in order to have both the functions, the device has a light semitransmitting film (refer to Japanese Unexamined Patent Publication JP-A 8-292412 (1996)). In addition, it is proposed for like purposes to use a light semitransmitting film in an active matrix type of light semitransmitting type liquid crystal display device (refer to Japanese unexamined Patent Publication JP-A 7-318929 (1995)).

Also as such a light semitransmitting type liquid crystal display device, the one of function separation type is known, wherein a light semitransmitting film is disposed on a surface of a rear placed substrate and a light scattering plate is disposed outside a front placed substrate.

However, in a light semitransmitting type liquid crystal display device of function separation type as described above, a light scattering plate (a front scattering film or the like) is placed outside a front placed substrate, so that specifically in the case where the device is used as a reflective type device, there is a problem that when ambient light enters the device, the incident light scatters in the travelling direction thereof while light scattered by the light scattering plate is generated (backscattering).

Backscattering always occurs regardless of an on/off operation for each pixel, so that in the off state, the luminance of black becomes high due to the backscattering and the contrast is lowered.

SUMMARY OF THE INVENTION

Therefore, an object of the present invention is to provide a light semitransmitting type liquid crystal display device wherein it is avoided that the contrast is lowered due to backscattering in a reflective type display mode.

As shown in FIGS. 1 and 11, the invention provides a light semitransmitting type liquid crystal display device comprising a first substrate member including a first substrate, a group of bumps which is formed on one surface of the first substrate and composed of a lot of bumps which are made of a transparent resin and are arranged at random, a first group of light semitransmitting electrode stripes with which the group of bumps is coated and a first orientation layer formed on the first group of light semitransmitting electrode stripes; and a second substrate member including a second light transmitting substrate, a second group of transparent electrode stripes formed on the second light transmitting substrate and a second orientation layer formed on the second group of transparent electrode stripes, wherein the first group of light semitransmitting electrode stripes and the second group of transparent electrode stripes are bonded via nematic liquid crystal so as to intersect each other, to arrange pixels in a matrix form.

As shown in FIGS. 10, 12, 13 and 14, the invention provides another light semitransmitting type liquid crystal display device a first substrate member including a first substrate, a group of bumps which is formed on one surface of the first substrate and composed of a lot of bumps which are made of a transparent resin and are arranged at random, a light semitransmitting film with which the group of bumps is coated, a first group of transparent electrodes formed on the light semitransmitting film and a first orientation layer formed on the first group of transparent electrodes; and a second substrate member including a second light transmitting substrate, a second transparent electrode formed on the second light transmitting substrate and a second orientation layer formed on the second transparent electrode, wherein nematic type liquid crystal is interposed between the first substrate member and the second substrate member to arrange pixels in a matrix form.

As described above, according to the invention, a group of bumps composed of a lot of bumps which are made of transparent resin and are arranged at random is formed on a substrate and the group of bumps is coated with the group of light semitransmitting electrode stripes, or a group of bumps composed of a lot of bumps which are made of transparent resin and are arranged at random is formed on the substrate and the group of bumps is coated with a light semitransmitting film, so that a light scattering plate can be omitted. This solves a conventional problem of occurrence of backscattering and reduces the brightness in the off state in the reflective type display mode, with the result that it is possible to provide a high-performance light semitransmitting type liquid crystal display device with increased contrast.

In the light semitransmitting type liquid crystal display device of the invention it is preferable that the light semitransmitting film is made of one or more metals selected from the group consisting of Cr, Al and Ag, and has a thickness of 50 to 500 Å.

In the light semitransmitting type liquid crystal display device of the invention, it is preferable that the light semitransmitting film has a reflective type index of 30 to 65% and a transmissivity of 15 to 50%.

In the light semitransmitting type liquid crystal display device of the invention, it is preferable that the semitransmtting film is composed of alternately laminated first-refractive-index layers 54 and second-refractive-index layers 55, which second refractive index is higher than the first refractive index.

In the light semitransmitting type liquid crystal display device it is preferable that the first-refractive-index layer 54 is made of one or more selected from the group consisting of $SiO_2$, $AlF_3$, $CaF_2$ and $MgF_2$ and has a thickness of 25 to 2000 Å, and the second-refractive-index layer 55 is made of one or more selected from the group consisting of $TiO_2$, $ZrO_2$ and $SnO_2$ and has a thickness of 25 to 2000 Å.

In the light semitransmitting type liquid crystal display device of the invention, it is preferable that the light semitransmitting film has a thickness of 50 to 12000 Å.

In the light semitransmitting type liquid crystal display device of the invention, it is preferable that the first-refractive-index layer 54 has a refractive index of 1.3 to 1.6 and the second-refractive-index layer 55 has a refractive index of 2.0 to 2.8.

BRIEF DESCRIPTION OF THE DRAWINGS

Other and further objects, features, and advantages of the invention will be more explicit from the following detailed description taken with reference to the drawings wherein.

FIG. 15 is an enlarged sectional view of another lamination structure of the light semitransmitting film 4a;

FIG. 16 is an enlarged sectional view of still another lamination structure of the light semitransmitting film 4a;

FIG. 17 is an enlarged sectional view of yet another lamination structure of the light semitransmitting film 4a;

FIG. 18 is an enlarged sectional view of further another lamination structure of the light semitransmitting film 4a; and FIG. 19 is a schematic sectional view of a conventional light semitransmitting type liquid crystal display device

DETAILED DESCRIPTION OF THE PREFERRED EMBODIMENTS

Figure 1:
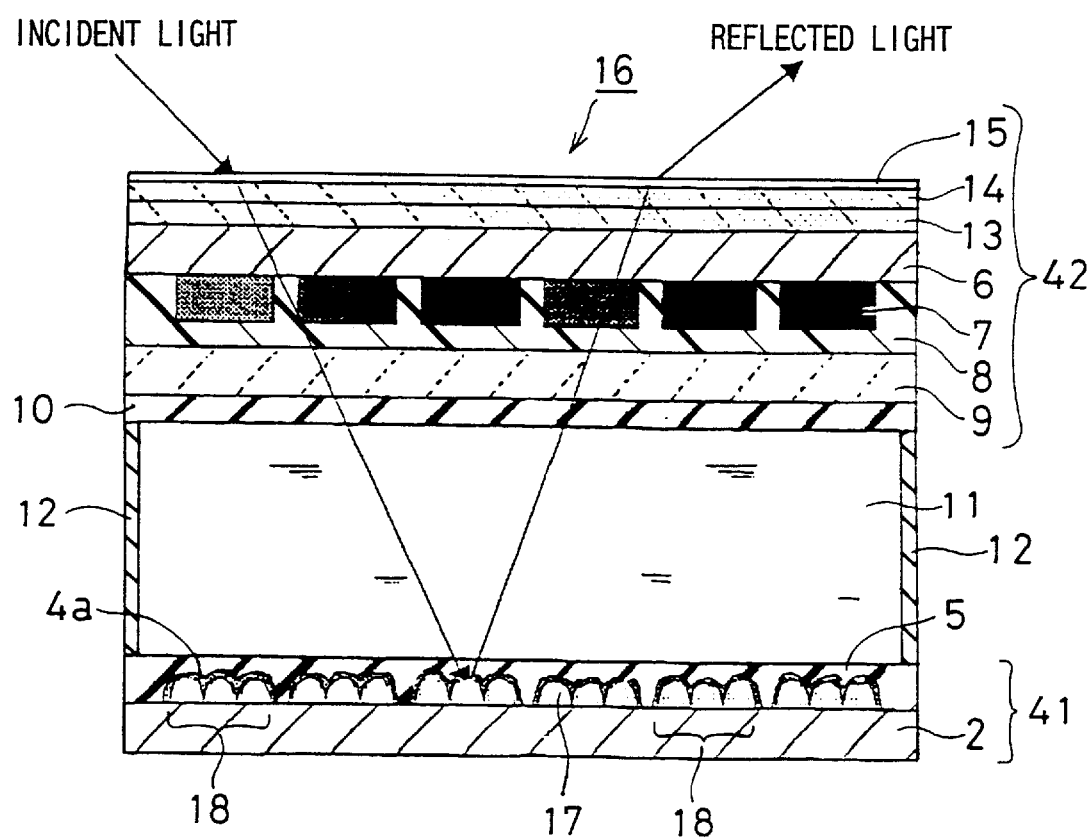
FIG. 1 is a schematic sectional view of a light semitransmitting type liquid crystal display device according to the present invention.

One embodiment of the present invention will be illustrated below referring to FIGS. 1 to 10.

In FIGS. 1 to 10, like elements will be denoted by like reference characters of the conventional liquid crystal display device 1 as shown in FIG. 19.

A Light Semitransmitting Type Liquid Crystal Display Device

Referring to FIG. 1, a light semitransmitting type liquid crystal display device 16 for color display will be explained.

The light semitransmitting type liquid crystal display device 16 comprises a segment-side glass substrate 2 (e.g., 0.7 mm thick), and a common-side glass substrate 6 (e.g., 0.7 mm thick). In connection with the first substrate member 41, on one surface of the glass substrate 2 are arranged a group of bumps 17 which are nearly hemispherical (e.g., 5 to 15 $\mu$m diameter) and are made of a highly light transmitting resin. The group of bumps is coated with a light semitransmitting film 4a (e.g., 250 Å thick) made of thin metal film such as chromium, aluminum or silver which film 4a works as the group of light semitransmitting electrode stripes. The light semitransmitting film 4a is made of a lot of strips arranged in parallel, and the respective strips correspond to individual electrodes 18.

Then, the light semitransmitting film 4a is coated with an orientation layer 5 made of polyimide resin, rubbed in a specific direction. Between the group of bumps coated with the light semitransmitting film 4a and the orientation layer 5, a smoothing film made of resin or $SiO_2$ may be formed by a spattering method, a dip method, a printing method, a spinner method or the like.

Regarding the second substrate member 42, color filters 7 are formed for respective pixels corresponding to intersections of electrodes 18 and electrodes 19 on the glass substrate 6. The color filter 7 is formed in a pigment dispersion method, that is, formed by applying a photosensitive resist prepared with a pigment (red, green and blue) in advance onto the substrate and executing photolithography. An overcoat layer 8 made of acrylic resin and a lot of transparent strip electrodes 9 made of ITO (indium tin oxide) are formed thereon. The transparent electrodes 9 intersect the electrodes 18 at right angles. Here, the overcoat layer 8 is not necessarily formed, and the transparent electrodes 9 may be formed immediately on the color filter 7 to omit the overcoat layer 8. In addition, an orientation layer 10 made of polyimide resin, rubbed in a specific direction is formed on the transparent electrodes 9. While the orientation layer 10 is formed immediately on the transparent electrodes 9, an electrical insulation film made of synthetic resin, $SiO_2$ or the like may be interposed between the orientation layer 10 and the transparent electrodes 9.

Then, the first substrate member 41 and the second substrate member 42 of the above construction are bonded with each other by a seal member 12 via liquid crystal 11 made of chiral nematic liquid crystal twisted by an angle of 200° to 260°, for example. Further, in order to make the thickness of the liquid crystal 11 uniform, a lot of spacers are placed between the first and second substrate members 41 and 42.

Furthermore, outside the glass substrate 6, a first retardation film 13 and second retardation film 14 made of polycarbonate or the like and an iodic polarizer plate 15 are sequentially formed. They are bonded by application of an adhesive made of acrylic material.

In the liquid crystal display device 16 of the above construction, incident light from an external lighting such as sunlight or a fluorescent lamp passes through the polarizer plate 15, the second retardation film 14, the first retardation film 13, the glass substrate 6, the color filter 7 and the liquid crystal 11 to reach the light semitransmitting film 4a, the light is reflected by the light semitransmitting film 4a, and the reflected light is emitted.

In this manner, the group of bumps is coated with the light semitransmitting film 4a, so that a conventional light scattering plate does not need to be used, and therefore backscattering would not occur. As a result, the luminance in the off state in the reflective type display mode is reduced and the contrast is increased.

[A Method of Forming The Group of Bumps]

Figure 2:
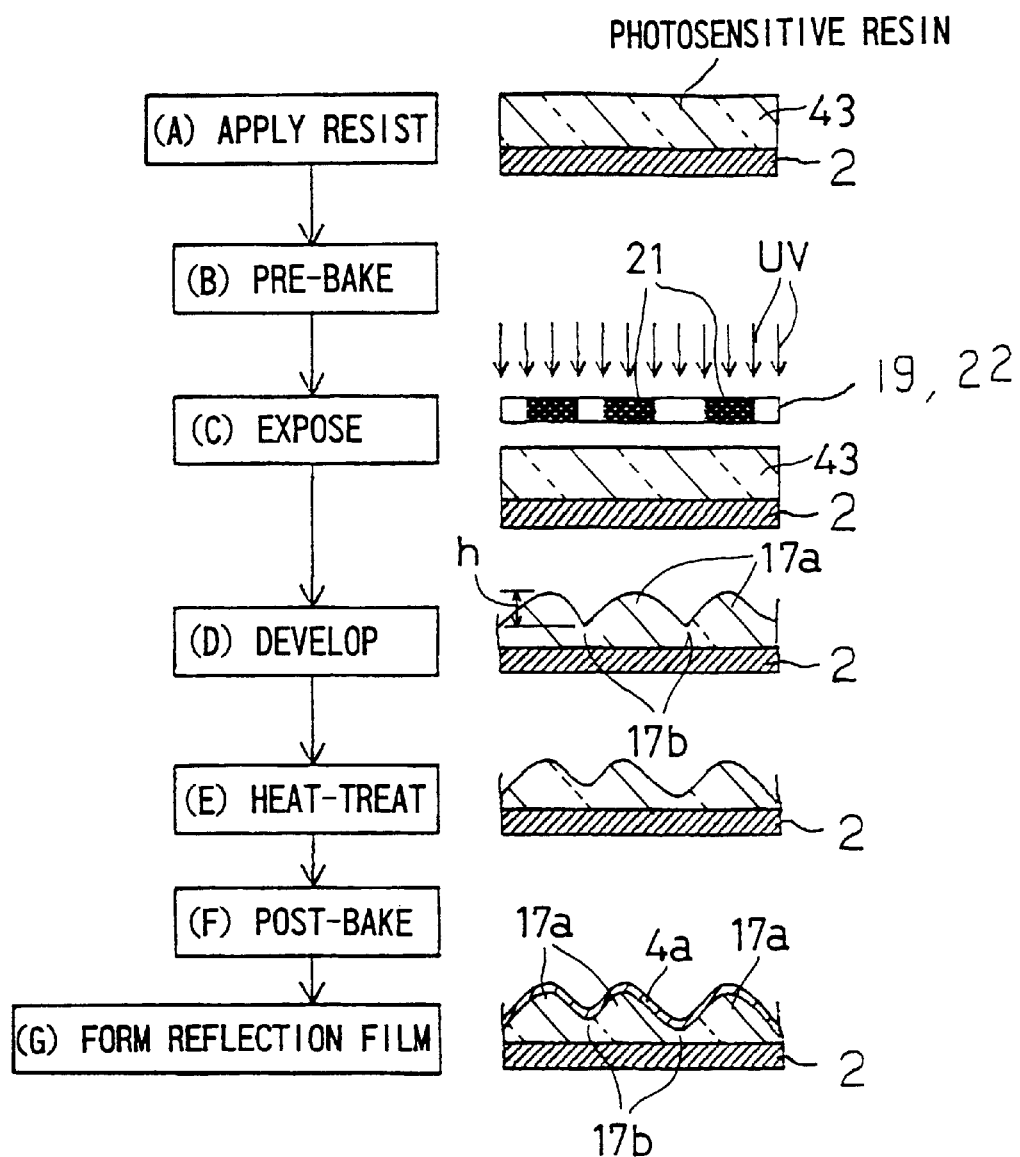
FIG. 2 is a process view of forming a group of bumps of a light semitransmitting type liquid crystal display device according to the invention.

The group of bumps on the glass substrate 2 is formed by undergoing the processes (a) to (g) as shown in FIG. 2.

Process (a)

A photosensitive synthetic resin (product: PC339H, produced by JSR Corporation) 43 in which an acrylic resin is contained as a major constituent and diethylene glycol methyl ethyl ether is used as a solvent, is applied by spin coating on the glass substrate 2. It is possible to control the film thickness of the resin 43 by the rotation number of a spinner. In this example, the rotation number of a spinner is set to 1000 rpm, and a positive photosensitive resin with a thickness of about 2 μm is applied.

Process (b)

The substrate 2 which is coated with the resin 43 in the above manner is pre-baked by using a hotplate at a temperature of 90° C. for two minutes, for example.

Process (c)

Next, the substrate is exposed using a mask for photolithography. Here, the substrate is entirely exposed using ultraviolet (UV) in the direction of the normal to the substrate 2.

Figure 3:
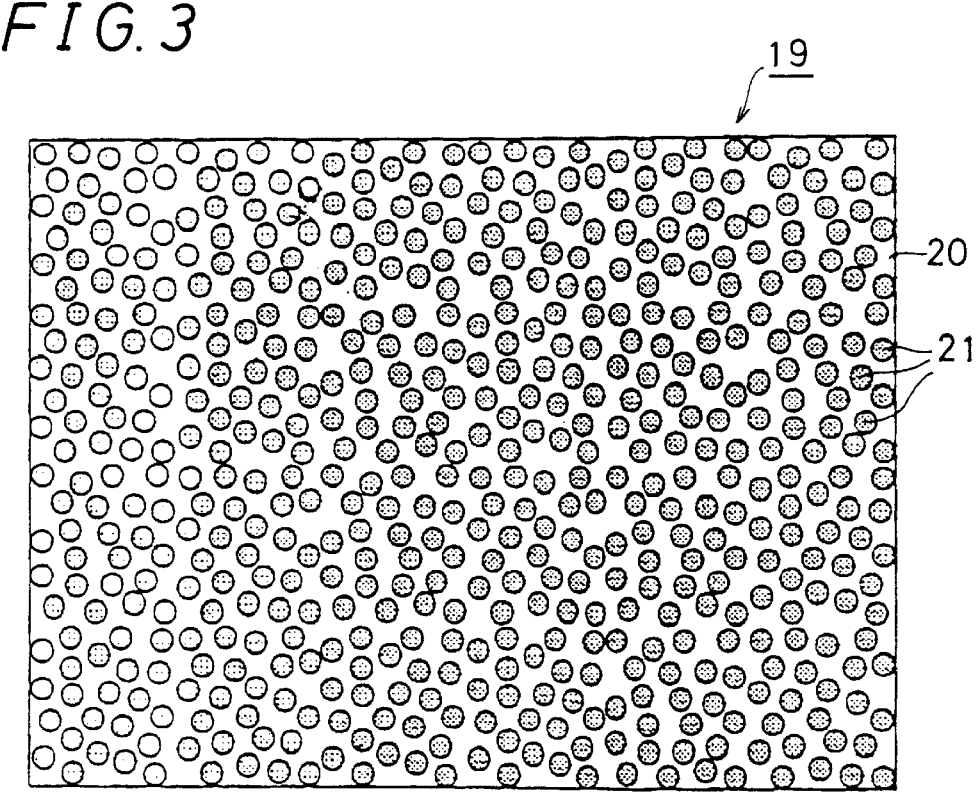
FIG. 3 is a plan view of a photo mask for forming a group of bumps.
Figure 4:
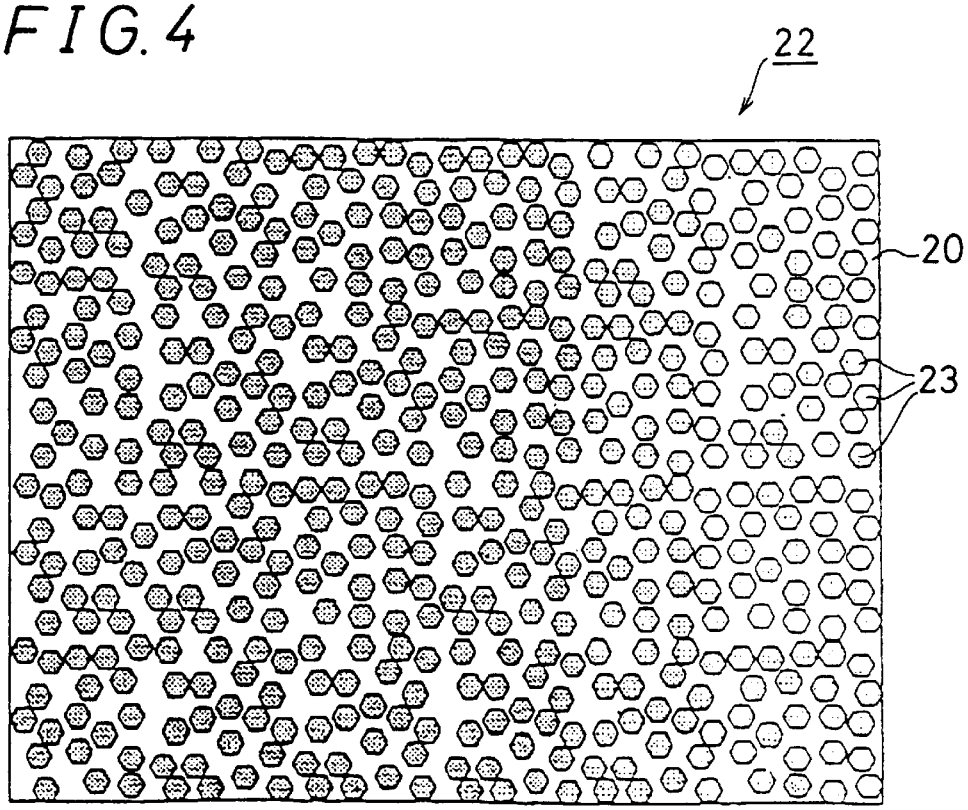
FIG. 4 is a plan view of another photo mask for forming a group of bumps.

The mask for photolithography is shown in FIGS. 3 and 4. A photo mask 19 is the one that a lot of light-shielding circular spots 21 (e.g., 6 μm diameter) made of Cr metal, iron oxide or the like are placed at random on a glass substrate 20. In the case where an image display surface is 5.7 inch size, approximately 50 million spots are placed on the glass substrate 20 corresponding to one display surface.

Other than a circle, the spot may be a polygon 23 such as a box, a pentagon, a hexagon or the one with more corners as in a photo mask 22 as shown in FIG. 4, for example. However, a circle is preferable in order not to make differences in scattering characteristics depending on a viewing direction. Then, bumps 17 almost the same in shape as the spots are formed.

Process (d)

Development is executed after the process (c). As a developer, PD523AD (with a concentration of 0.05%) produced by JSR corporation is used, for example. It is possible to adjust the progress of development by changing development time, and as development is stopped with proper timing, the bumps 17a are connected with the adjacent ones at ends 17b thereof, and connected sequentially.

Figure 5:
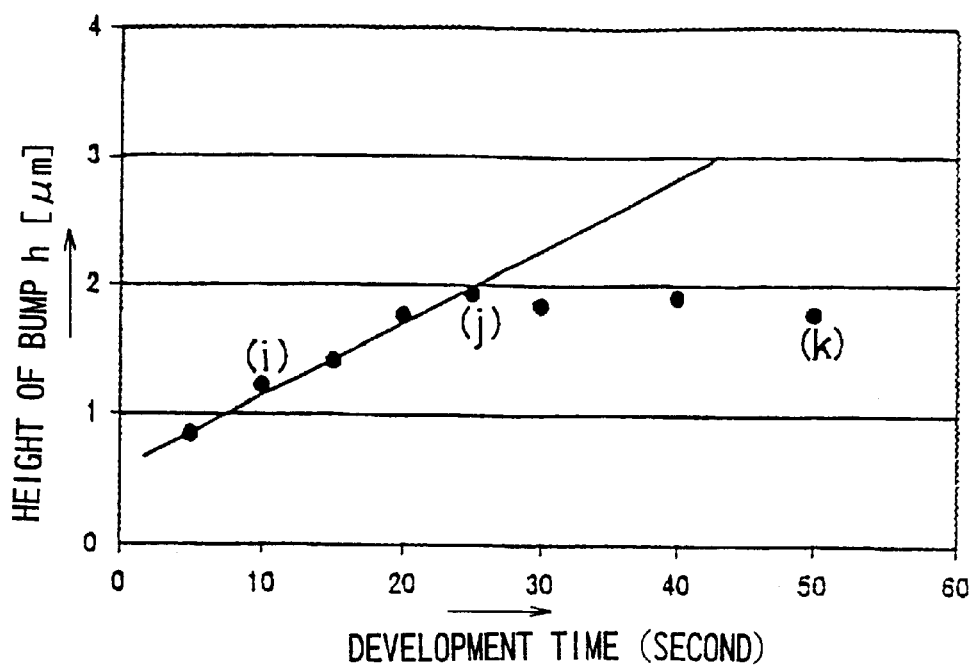
FIG. 5 is a diagram showing a relation between a development time when forming a group of bumps and the height from dip to bump of a group of bumps.
Figure 6:
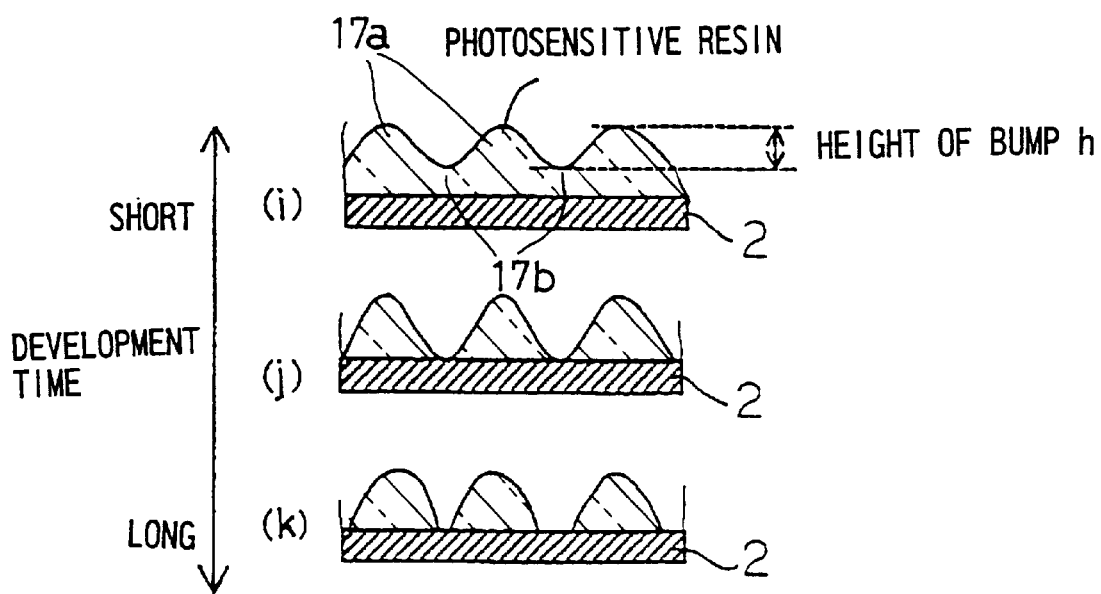
FIG. 6 is a view showing changes of the shape of a photosensitive resin layer depending on a development time when forming a group of bumps.

FIGS. 5 and 6 show the state of the bumps in accordance with the progress of development.

FIG. 5 shows the height h of bumps with development time, wherein the horizontal axis indicates development time (second). the vertical axis indicates the height h of bumps (μm), and black points indicate measurement data.

Until the development time reaches a point of 25 seconds, the height h of bumps increases with time, whereas after the development time exceeds the point of 25 seconds, the glass substrate 2 is exposed and the depth dug to development becomes uniform, whereby the change of the height h of bumps becomes very small.

FIG. 6 shows the sectional shape of the group of bumps on the glass substrate 2 at black points (i), (j) and (k) indicating measurement data of FIG. 5, respectively.

While the height of bumps h can be made large by selecting a development time of 20 seconds, for example, the development time may be changed as necessary depending on the application amount of resist, the concentration of developer, the pre-baking conditions and so on.

At exposure in the process (c), interference arises when UV passes through the photo masks 19, 22, and photolysis occurs in the resin of the bumps 17a immediately under the masks slightly, so that the corners of the bumps become round in the following development process (d).

Process (e)

In this heat treatment, the bumps and dips 17a, 17b are melted at low temperature (e.g., at 130° C. for two minutes) to the extent of not largely changing the shape of the surface.

Process (f)

In the following post-bake process, the resin is entirely hardened at a high temperature (e.g., at 200° C. for 30 minutes).

In this manner, the resin is slightly melted to make the shape of the surface of the bumps and dips 17a, 17b smooth and finely adjust the shapes of the bumps and dips in the process (e), and then hardened in the process (f).

Finally, the group of bumps is coated with the light semitransmitting film 4a made of metal such as chromium, aluminum or silver so that the film thickness becomes 250 Å by spattering or evaporating. First spattering the metal film on the surface so that the film thickness becomes 250 Å and thereafter patterning stripes by using a photoresist complete an electrode structure.

Figure 7:
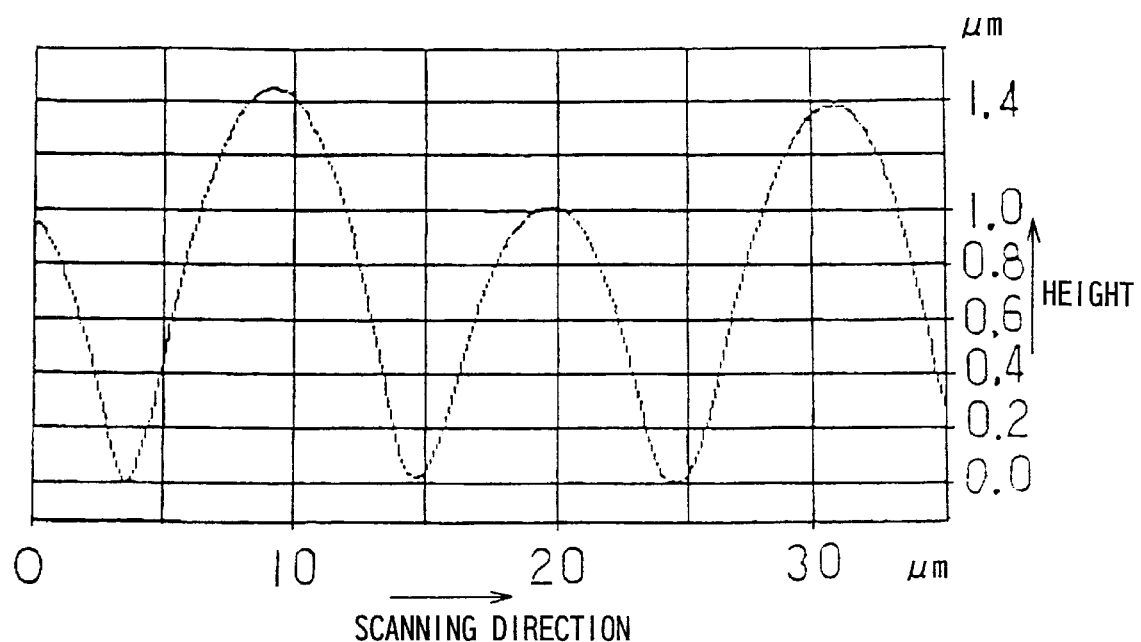
FIG. 7 is an enlarged view of a group of bumps.
Figure 8:
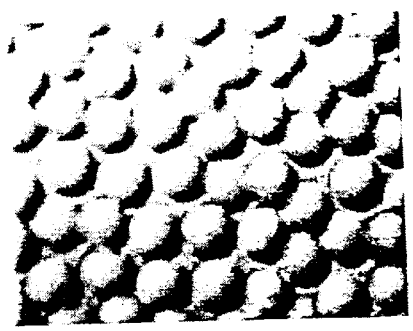
FIG. 8 is a photograph of a group of bumps.

The shape of the surface of the group of bumps coated with the light semitransmitting film 4a completed by undergoing the processes (a) to (g) is scanned as shown in FIG. 7, and a photograph thereof is taken as shown in FIG. 8.

FIG. 7 is a view of the shape of the surface scanned by a surface shape measurement microscope produced by KEYENCE, wherein the horizontal axis (X) indicates a scanning direction, the vertical axis (Z) indicates the height, each in units of µm. Further, FIG. 8 is a view of a photograph taken by 500 times by using an optical microscope (BH3MJL produced by Olympus).

It is apparent from FIGS. 7 and 8 that the bumps are shaped smooth in the melting process and the adjacent bumps are connected to each other.

In the light semitransmitting type liquid crystal display device 16, it is preferable to connect adjacent bumps 17 of the group of bumps. This eliminates a flat portion between the bumps 17, thereby lowering the flat level of the group of bumps, reducing regular reflection components and improving light scattering characteristics. As a result, a viewing angle is widened. While the adjacent bumps 17 of the group of bumps are connected almost entirely as long as seen in the picture, light scattering characteristics would not be affected even when some of the bumps are not connected.

Further, the group of bumps may be formed in the processes (a) to (d), (f) and (g), excluding the heat treatment in the process (e) (the melting process to the extent of not largely changing the shape of the surface) of FIG. 2.

Figure 9:
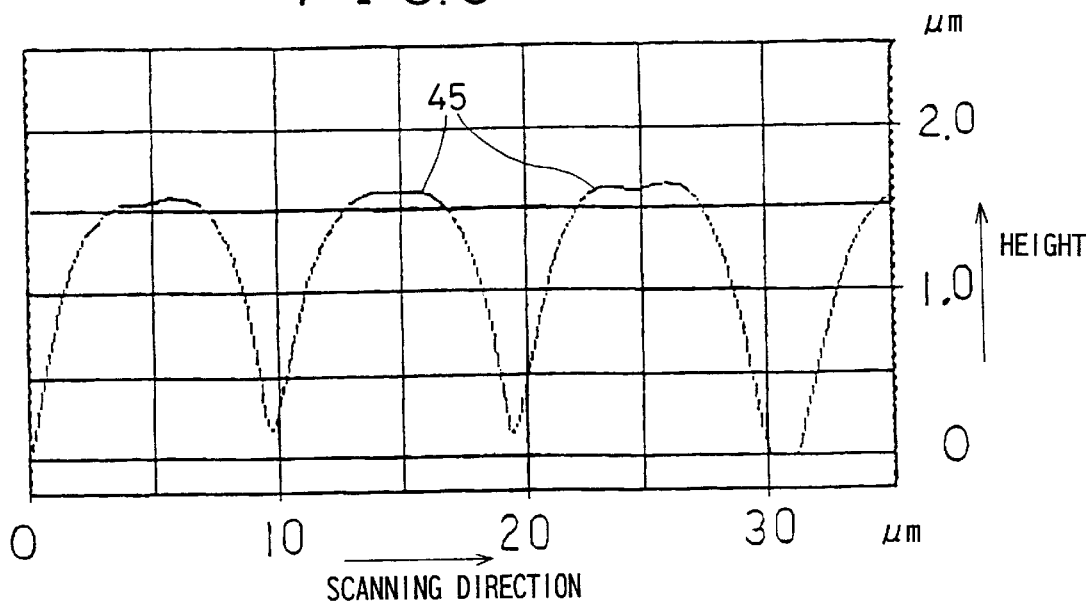
FIG. 9 is an enlarged view of another group of bumps.

By forming the group of bumps coated with the light semitransmitting film 4a in a forming method without the process (e) and scanning the shape of the surface thereof, such a result as shown in FIG. 9 is obtained. Although, in the case where the melting process is omitted, the bump is shaped to have a slightly flat portion 45 on the top surface thereof, the flat level of the group of bumps is lowered and regular reflection components are reduced as mentioned above, whereby light scattering characteristics are improved and a viewing angle is widened.

Another Light Semitransmitting Type Liquid Crystal Display Device

Next, another light semitransmitting type liquid crystal display device will be explained.

Figure 10:
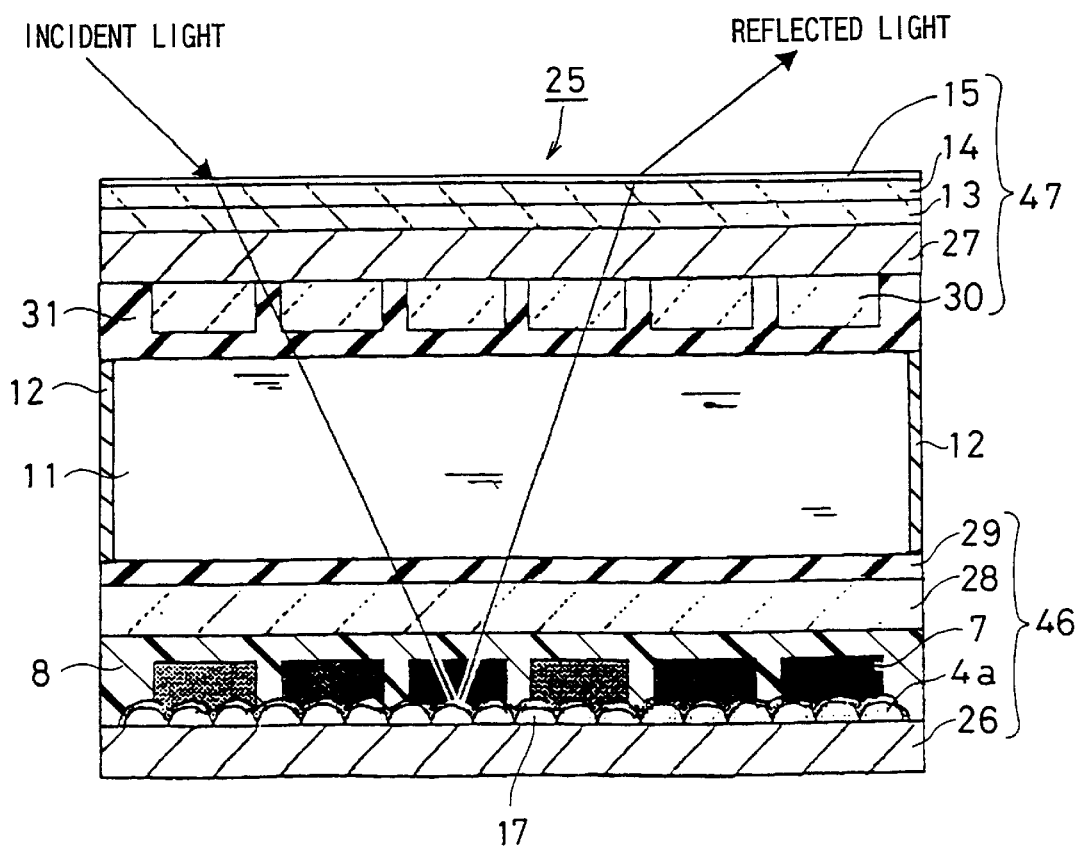
FIG. 10 is a schematic sectional view of another light semitransmitting type liquid crystal display device according to the invention.

In a light semitransmitting type liquid crystal display device 25 for color display as shown in FIG. 10, reference numeral 26 denotes a common-side glass substrate (e.g., 0.7 mm thick) and reference numeral 27 denotes a segment-side glass substrate (e. g., 0.7 mm thick). Regarding the first substrate member 46, a group of bumps which are arranged at random as in the liquid crystal display device 16 is formed by arranging a lot of almost hemispherical bumps 17 made or transparent resin on one main surface of the glass substrate 26, and this group of bumps is coated with a light semitransmitting film 4a (with a film thickness of 250 Å) made of metal such as chromium, aluminum or silver. Then, on the group of bumps, a color filter 7 is formed for respective pixels corresponding to intersections of electrodes 28 and electrodes 30. Furthermore, an overcoat layer 8 made of acrylic resin and a lot of transparent electrodes 28 made of ITO arranged in parallel are formed. On the transparent electrodes 28, an orientation layer 29 made of polyimide resin rubbed in a specific direction is formed.

While the orientation layer 29 is formed immediately on the transparent electrodes 28, an electrical insulation film made of synthetic resin or $SiO_2$ may be interposed between the orientation layer 29 and the transparent electrodes 28, and moreover the overcoat 8 may be omitted. In addition, a smoothing film made of resin or $SiO_2$ may be formed on the group of bumps to form the color filter 7 placed for every pixel on this smooth film.

Regarding the second substrate member 47, a lot of transparent electrodes 30 made of ITO arranged in parallel and an orientation layer 31 made of polyimide resin rubbed in a specific direction are sequentially formed on the glass substrate 27. Between the transparent electrodes 30 and the orientation layer 31, an electrical insulation film made of synthetic resin or $SiO_2$ may be interposed.

Then, the first substrate member 46 and the second substrate member 47 of the above construction are bonded with each other by a seal member 12 via liquid crystal 11. Furthermore, a first retardation film 13 and second retardation film 14 made of polycarbonate or the like, and an iodic polarizer plate 15 are sequentially formed outside the glass substrate 27.

In the liquid crystal display device 25 of the above construction, incident light from an external lighting such as sunlight or a fluorescent lamp passes through the polarizer plate 15, the second retardation film 14, the first retardation film 13, the glass substrate 27, the liquid crystal 11, the color filter 7 and so on to reach the light semitransmitting film 4a, the light is reflected by the light semitransmitting film 4a having the same construction as the embodiments in FIGS. 1 to 9, and the reflected light is emitted.

In this manner, also in the liquid crystal display device 25 according to the invention, a problem of backscattering as occurring conventionally is solved by omitting a light scattering plate, with the result that the brightness in the off state in the reflective type display mode is reduced and the contrast is increased.

Figure 11:
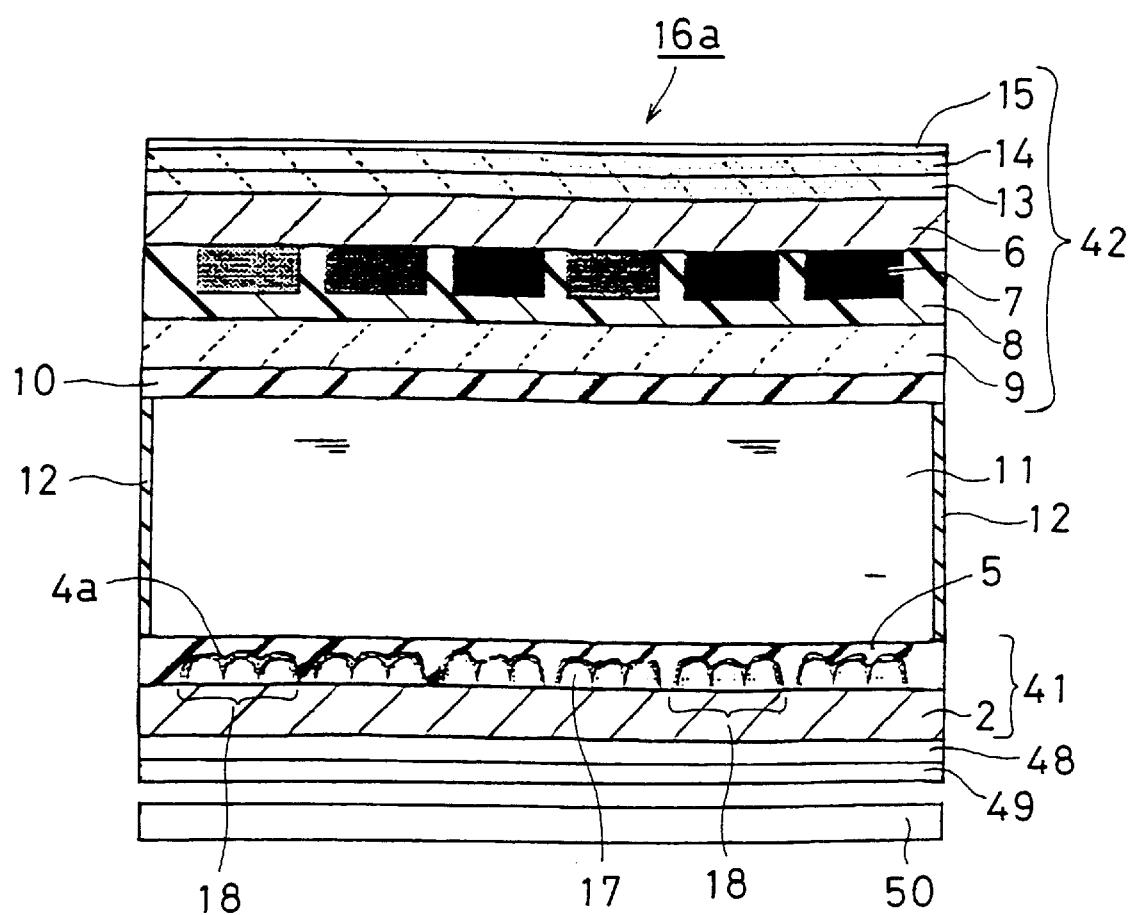
FIG. 11 is a cross sectional view showing a light semitransmitting type liquid crystal display device 16a according to another embodiment of the present invention.

While the liquid crystal display device 16 as shown in FIG. 1 is the one of reflective type display mode, in another embodiment of the invention, light transmitting display mode is made by sequentially forming a retardation film 48 made of polycarbonate or the like and an iodic polarizer plate 49 outside the glass substrate 2 (at the bottom of FIG. 11) and further placing a backlight 50 as shown in FIG. 11.

Other constitutional features of the embodiment as shown in FIG. 11 are the same as those of the embodiments described with reference to FIGS. 1 to 9. In the embodiment of FIG. 11, a light semitransmitting type liquid crystal display device 16a may be implemented.

Figure 12:
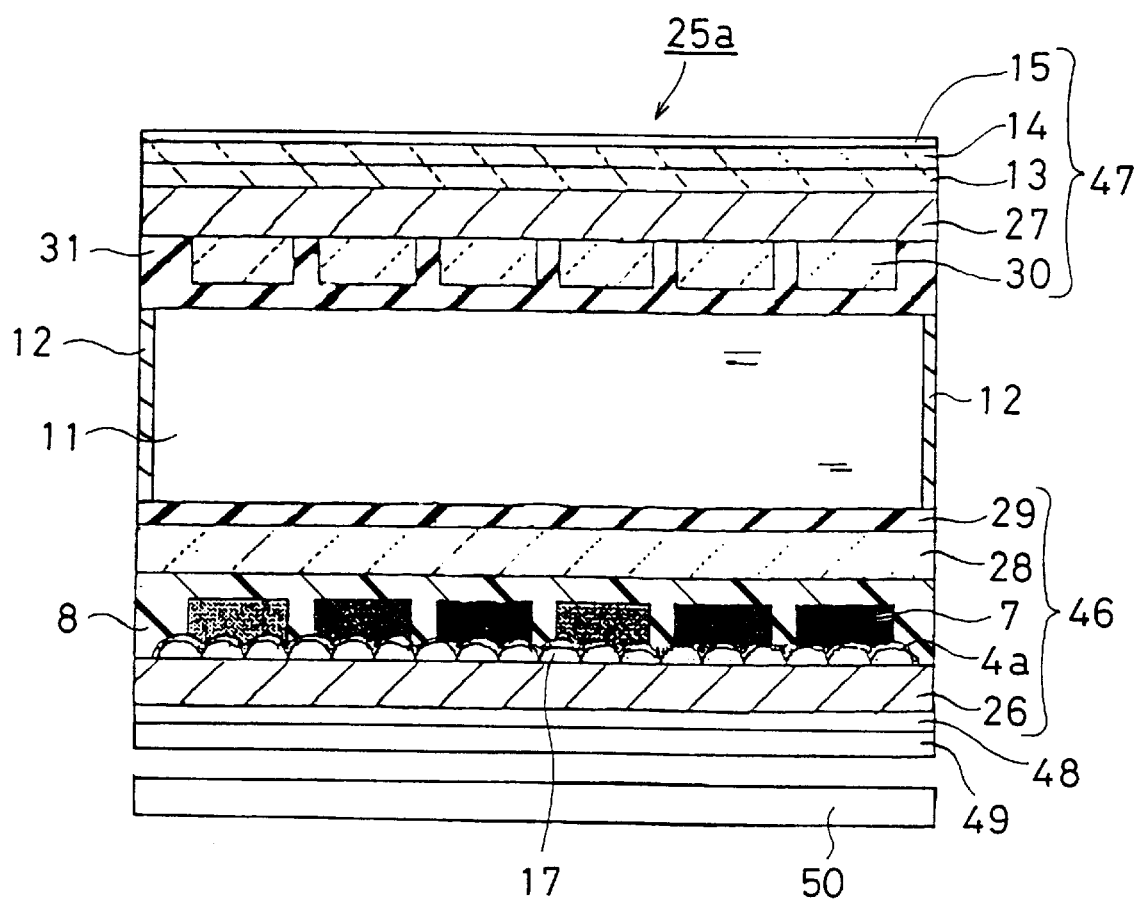
FIG. 12 is a cross sectional view showing a light semitransmitting type liquid crystal display device 25a according to still another embodiment of the present invention.

FIG. 12 is a cross sectional view showing a liquid crystal display device 25a according to another embodiment of the present invention. This embodiment is similar to the foregoing embodiment as shown in FIG. 10, and corresponding portions are designated by the same reference characters. In particular, in this embodiment, the liquid crystal display device 25a can be set to the light transmitting display mode by sequentially forming a retardation film 48 made or polycarbonate or the like and an iodic polarizer plate 49 outside the glass substrate 26 and further mounting a backlight 50.

Figure 13:
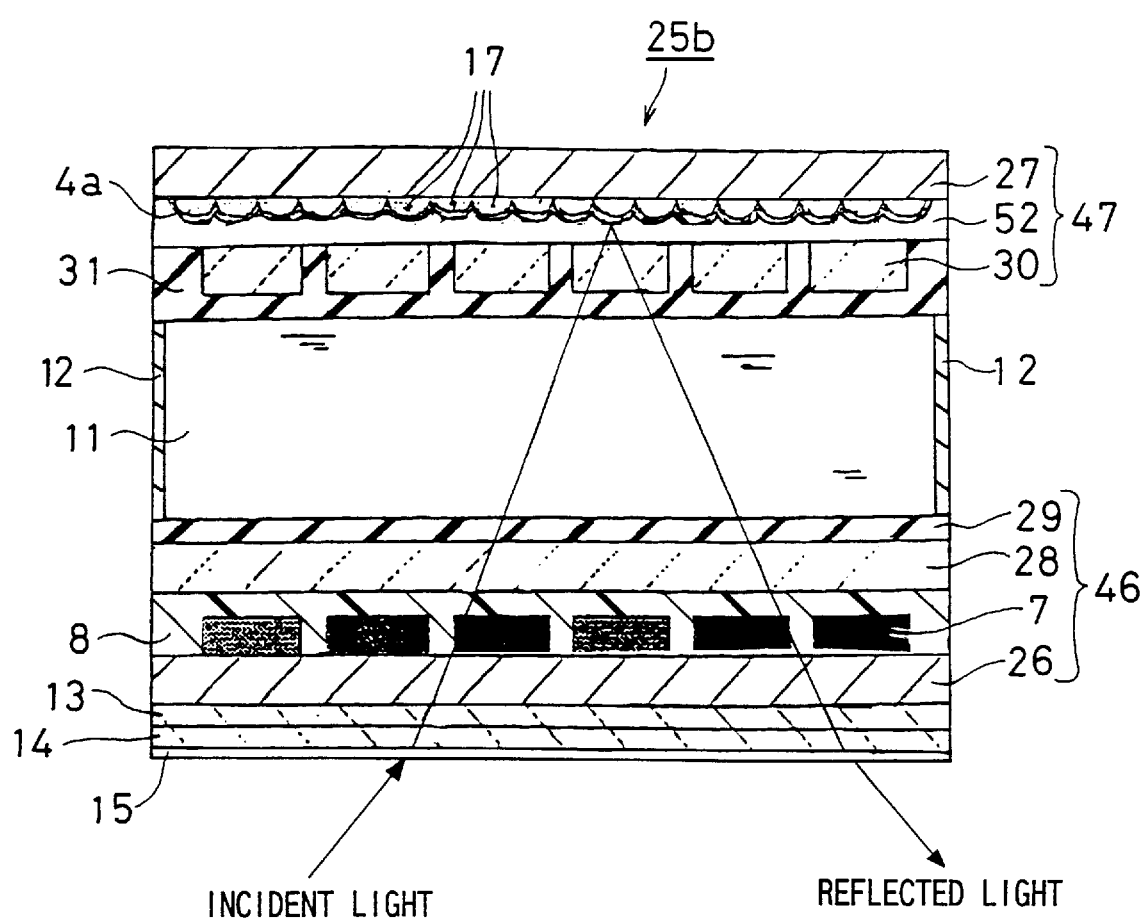
FIG. 13 is a cross sectional view showing a light semitransmitting type liquid crystal display device 25b according to still another embodiment of the present invention.

Further, although the liquid crystal display device 25 has such a construction that a group of bumps is formed by arranging a lot of bumps 17 at random on the glass substrate 26 and this group of bumps is coated with the light semitransmitting film 4a, the device 25 may be a light semitransmitting type liquid crystal display device 25b which has, instead or the above construction, in an embodiment of FIG. 13, a construction of causing light to enter from the side of the glass substrate 26 by forming a group of bumps composed of a lot of bumps 17 on the glass substrate 27, coating this group of bumps with a light semitransmitting film 4a, forming a transparent smooth film 52 made of synthetic resin, $SiO_2$ or the like, sequentially forming a lot of transparent electrodes 30 made of ITO arranged in parallel and an orientation layer 31 made of polyimide resin rubbed in a specific direction on the smooth film, and mounting the first retardation film 13, the second retardation film 14 and the polarizer plate 15 on the outer surface or the glass substrate 26.

Other constitutional features of the embodiment as shown in FIG. 13 is similar to those of the foregoing embodiment as shown in FIG. 10, and corresponding portions are designated by the same reference characters.

About The Light Semitransmitting Film 4a

The light semitransmitting film 4a transmits and as well reflects light, and moreover avoids retardation when interposed between two polarizer plates.

The light semitransmitting film 4a is a thin film made of metal such as chromium, aluminum or silver as mentioned before, and the thicker the film thickness becomes, the smaller light transmissivity becomes and the larger light reflectivity becomes. The thickness of such a metal thin film is set to 50 Å to 500 Å, preferably, 100 Å to 400 Å although the light absorption coefficient is different depending on the kind of metal and the thickness is determined depending on whether an increase of performance is required for a use as the reflective type or a use as the light transmitting type. This makes it possible to attain properties of a light semitransmitting type liquid crystal display device such as reflectivity is 30% to 65% and transmissivity is 15% to 50%.

For example, in the case where the light semitransmitting film 4a is made by aluminum metal thin film so as to have a film thickness of 250 Å, reflectivity is 65% and transmissivity is 15%.

Figure 14:
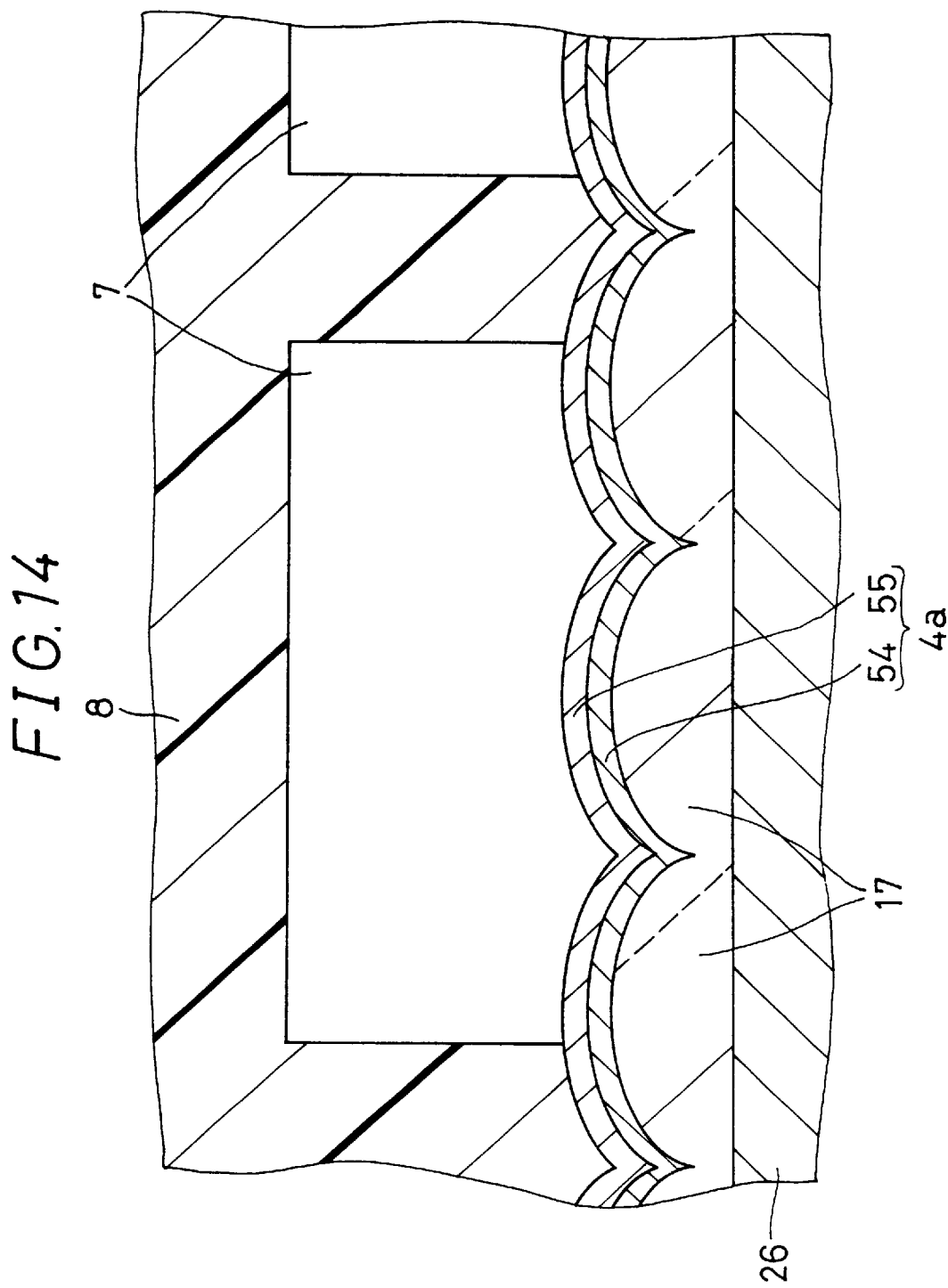
FIG. 14 is a cross sectional view showing a portion of another embodiment of the present invention.

The light semitransmitting film 4a may be formed by a dielectric half mirror of FIG. 14 instead of a metal thin film. An embodiment as shown in FIG. 14 is similar to that as shown in FIG. 10 and like elements are given like reference characters. In connection with the structure of the embodiment, only a part of the entirety of the structure is shown in FIG. 14. The film 4a has a lamination structure of alternately laminating low-refractive-index layers 54 and high-refractive-index layers 55 on the group of bumps. With this structure, part of light which enters via the liquid crystal 11 is reflected by the high-refractive-index layers 55, and the remaining light transmitted by the high-refractive-index layers 55 is reflected by the low-refractive-index layers 54. These two reflected lights are interfered, whereby reflection performance of the light is significantly increased and so-called increased reflection occurs. Furthermore, light absorption as occurring in the case of the metal thin film would hardly occur (in the case of an aluminum metal material, approximately 20% of light is absorbed in a visible light region), so that both a reflection performance and a transmission performance can be increased, and properties of a light semitransmitting type liquid crystal display device such as reflectivity is 30% to 80% and transmissivity is 20% to 70% can be attained.

Although the high-refractive-index layer 55 and low-refractive-index layer 54 as described above may be made of any material as long as there is a difference in refractive index between the layers, it is preferable that the high-refractive-index layer 55 has a refractive index of 2.0 to 2.8 and is made of $TiO_2$, $ZrO_2$, $SnO_2$ or the like. On the other hand, it is preferable that the low-refractive-index layer 54 has a refractive index of 1.3 to 1.6 and is made of $SiO_2$, $AlF_3$, $CaF_2$, $MgF_2$ or the like.

When the thickness of the high-refractive-index layer 55 is set to 25 Å to 2,000 Å and the thickness of the low-refractive-index layer 54 is set to 25 Å to 2,000 Å, increased reflection mentioned before becomes the most outstanding. In addition, when the thickness of the light semitransmitting film 4a is set to 50 Å to 12,000 Å, increased reflection becomes outstanding.

Further, the light semitransmitting film 4a has a lamination structure of alternately laminating low-refractive-index layers 54 and high-refractive-index layers 55 or alternately laminating high-refractive-index layers and low-refractive-index layers on the bumps 17. Although the light semitransmitting film 4a of FIG. 14 has two layers in total, which is composed of a low-refractive-index layer and a high-refractive-index layer, the light semitransmitting film 4a may be structured as shown in FIGS. 15 to 18.

Figure 15:
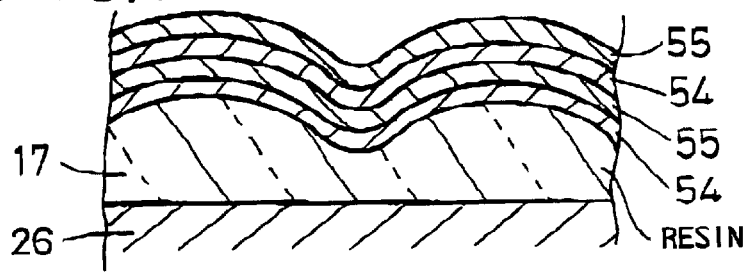

FIG. 15 is an enlarged sectional view of another lamination structure of the light semitransmitting film 4a. As shown in FIG. 15, the low-refractive-index layer 54 is firstly formed on the bumps 17 and next the high-refractive-index layer 55 is formed on the low-refractive--index layer 54. Such lamination of the low-refractive-index layer 54 and high-refractive-index layer 55 is repeated an arbitrary number of times. Although a total of four layers are laminated in the light semitransmitting film 4a of FIG. 15, an arbitrary even number of the layers in total may be laminated in this lamination structure.

Figure 16:
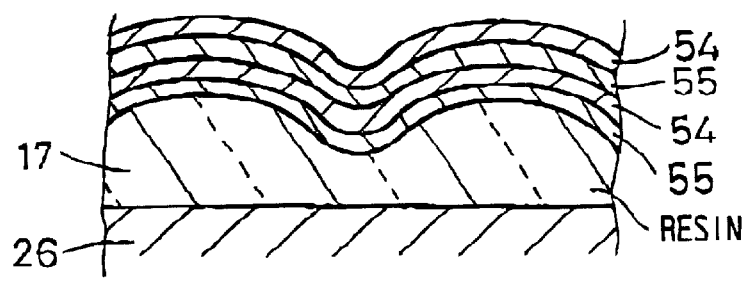

FIG. 16 is an enlarged sectional view of still another lamination structure of the light semitransmitting film 4a. As shown in FIG. 16, the high-refractive-index layer 55 is firstly formed on the bumps 17 and next the low-refractive-Index layer 54 is formed on the high-refractive-index layer 55. Such lamination of the high-refractive-index layer 55 and low-refractive-index layer 54 is repeated an arbitrary number of times. Although a total of four layers are laminated in the light semitransmitting film 4a of FIG. 16, an arbitrary even number of the layers in total may be laminated in this lamination structure.

Figure 17:
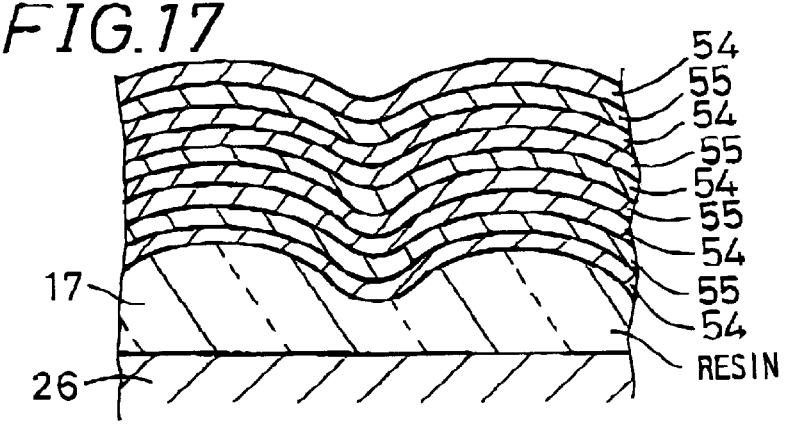

FIG. 17 is an enlarged sectional view of yet another lamination structure of the light semitransmitting film 4a. In this lamination structure, as shown in FIG. 17, the low-refractive-index layer 54 is firstly formed on the bumps 17 and next the high-refractive-index layers 55 and the low-refractive-index layers 54 are alternately laminated on the low-refractive-index layer 54 firstly formed on the bumps. Although a total of nine layers are laminated in the light semitransmitting film 4a of FIG. 17, an arbitrary odd number of the layers in total may be laminated in this lamination structure.

Figure 18:
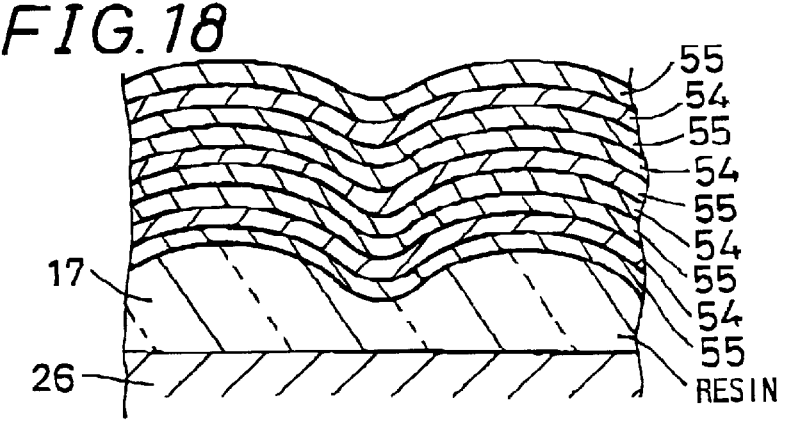

FIG. 18 is an enlarged sectional view of further another lamination structure of the light semitransmitting film 4a. As shown in FIG. 18, the high-refractive-index layer 55 is firstly formed on the bumps 17 and next the low-refractive-index layers 54 and the high-refractive-index layers 55 are alternately formed on the high-refractive-index layer 55 firstly formed on the bumps. Although a total of nine layers are laminated in the light semitransmitting film 4a of FIG. 18, an arbitrary odd number of the layers in total may be laminated in this lamination structure.

Furthermore, in the case of such a lamination structure, it is possible to set reflectivity and transmissivity as required by changing the lamination number, and hence design becomes more simple, so that it is possible to increase the production yield and reduce the production cost.

For example, in the case of a lamination structure with eight layers in total where low-refractive-index layers made of $SiO_2$ (with a film thickness of 940 Å) and high-refractive-index layers made of $TiO_2$ (with a film thickness of 630 Å) are sequentially laminated in alternate position on the group of bumps, reflectivity is 75% and transmissivity is 25%.

The embodiments of the invention as shown in FIGS. 14 to 18 and the embodiments of the invention described above in connection with FIGS. 14 to 18 can be widely implemented in connection with the embodiments as shown in FIGS. 1 to 9 and FIGS. 11 to 13.

EXAMPLE

When the liquid crystal display devices 16, 25 and the conventional device proposed in JP-A 8-201802 were made to be function separation type of STN-TYPE liquid crystal display devices, and the luminance and contrast in the reflective type mode were evaluated in the respective devices, such a result as shown in Table 1 was obtained.

Further, when the luminance and contrast thereof in the light transmitting mode were evaluated, such a result as shown in Table 2 was obtained.

TABLE 1

|  | On state | Off state | contrast |
| --- | --- | --- | --- |
| Liquid crystal display device 16 | 8.0 | 0.68 | 11.8 |
| Liquid crystal display device 25 | 9.0 | 0.74 | 12.2 |
| Conventional device | 7.8 | 1.41 | 5.5 |

TABLE 2

|  | On state | off state | contrast |
| --- | --- | --- | --- |
| Liquid crystal display device 16 | 1.29 | 0.068 | 19.0 |
| Liquid crystal display device 25 | 1.62 | 0.084 | 19.5 |
| Conventional device | 1.28 | 0.066 | 19.4 |

The luminance was measured by setting the entering direction of light into the device to −30° (when the direction of the normal is regard as 0°) and receiving the reflected light and the transmitted light, and the light-receiving direction was specified to the direction of the normal.

The luminance was expressed numerically by using a standard white plate reference. In other words, since the JIS defines the standard white plate as an MgO plate whose reflectivity is considered to be 100% when irradiated with light, the luminance in the invention is expressed by a relative value to the reflected light on the standard white plate (MgO). The contrast is "brightness in the on state/brightness in the off state" of a liquid crystal panel.

It is apparent from the tables that in the reflective type mode, the luminance is significantly large in the on state while the luminance is significantly small in the off state, so that the contrast is large. In the light transmitting mode, there is little difference in performance between the devices according to the invention and the conventional device.

The invention is not limited to the embodiments described above, and various changes and improvements can be made without departing from the scope of the invention.

For example, while an STN-type simple matrix color liquid crystal display device is used for explanation in the embodiments described above, an STN-type simple matrix monochrome liquid crystal display device, a TN-type simple matrix liquid crystal display device, a twist-nematic-type liquid crystal display device of TN-type active matrix or the like, or a bistable liquid crystal display device may be used to obtain like effects. In stead of the glass plate 2, 6 may be used a light transmitting substrate made of a synthetic resin.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A light semitransmitting type liquid crystal display device comprising;
   a first substrate member including:
      a first substrate
      a group of bumps which is formed on one surface of the first substrate and is composed of a lot of bumps which are made of a transparent resin and are arranged at random,
      a first group of light semitransmitting electrode stripes with which the group of bumps is coated, and
      a first orientation layer formed on the first group of light semitransmitting electrode stripes; and
   a second substrate member including:
      a second light transmitting substrate,
      a second group of transparent electrode stripes formed on the second light transmitting substrate, and
      a second orientation layer formed an the second group of transparent electrode stripes,
      wherein the first group of light semitransmitting electrode stripes and the second group of transparent electrode stripes are bonded via nematic liquid crystal so as to intersect each other, to arrange pixels in a matrix form.

2. A light semitransmitting type liquid crystal display device comprising:
   a first substrate member including:
      a first substrate,
      a group of bumps which is formed on one surface of the first substrate and composed of a lot of bumps which are made of a transparent resin and are arranged at random,
      a light semitransmitting film with which the group of bumps is coated,
      a first group of transparent electrodes formed on the light semitransmitting film, and
      a first orientation layer formed on the first group of transparent electrodes; and
   a second substrate member including:
      a second light transmitting substrate,
      a second transparent electrode formed on the second light transmitting substrate, and
      a second orientation layer formed on the second transparent electrode,
      wherein nematic type liquid crystal is interposed between the first substrate member and the second substrate member to arrange pixels in a matrix form.

3. The light semitransmitting type liquid crystal display device of claim 1 or 2, wherein the light semitransmitting film is made of one or more metals selected from the group consisting of Cr, Al and Ag, and has a thickness of 50 to 500 Å.

4. The light semitransmitting type liquid crystal display device of claim 1 or 2, wherein the light semitransmitting film has a reflective index of 30 to 65% and a transmissivity of 15 to 50%.

5. The light semitransmitting type liquid crystal display device of claim 2, wherein the semitransmitting film is composed of alternately laminated first-refractive-index layers and second-refractive-index layers, which second refractive index higher than the first refractive index.

6. The light semitransmitting type liquid crystal display device of claim 2,
   wherein the first-refractive-index layer is made of one or more selected from the group consisting of $SiO_2$, $AlF_3$, $CaF_2$ and $MgF_2$ and has a thickness of 25 to 2000 Å, and
   the second-refractive-index layer is made of one or more selected from the group consisting of $TiO_2$, $ZrO_2$ and $SnO_2$ and has a thickness of 25 to 2000 Å.

7. The light semitransmitting type liquid crystal display device of claim 6, wherein the light semitransmitting film has a thickness of 50 to 12000 Å.

8. The light semitransmitting type liquid crystal display device of claim 2, wherein the first-refractive-index layer has a refractive index of 1.3 to 1.6 and the second-refractive-index layer has a refractive index of 2.0 to 2.8.

* * * * *